United States Patent [19]

Brunner

[11] Patent Number: 4,759,426
[45] Date of Patent: Jul. 26, 1988

[54] PRESSURE OIL LUBRICATING DEVICE

[75] Inventor: Heinz Brunner, Albstadt-Ebingen, Fed. Rep. of Germany

[73] Assignee: Sipra Patententwicklungs-und Beteiligungsgesellschaft mbH, Tailfingen, Fed. Rep. of Germany

[21] Appl. No.: 67,223

[22] Filed: Jun. 25, 1987

[30] Foreign Application Priority Data

Jul. 24, 1986 [DE] Fed. Rep. of Germany ....... 3624982

[51] Int. Cl.$^4$ ............................................... F16N 7/38
[52] U.S. Cl. ..................................... 184/6.4; 139/45; 184/6.15; 184/7.1; 184/7.4
[58] Field of Search ........................ 417/317, 456, 502; 184/6, 6.15, 6.4, 108, 7.4, 7 D, 6.14, 7.1, 39.1; 139/1 R, 45

[56] References Cited

U.S. PATENT DOCUMENTS

| | | | |
|---|---|---|---|
| 2,351,620 | 6/1944 | Kocher | 184/6.14 |
| 2,468,219 | 4/1949 | Matthews, Sr. | 184/108 X |
| 2,499,571 | 3/1950 | Davis | 184/6 X |
| 4,359,895 | 11/1982 | Wolff | 123/617 |

FOREIGN PATENT DOCUMENTS

| | | | |
|---|---|---|---|
| 2229990 | 1/1974 | Fed. Rep. of Germany | 184/6.4 |
| 2537208 | 6/1984 | France | 184/108 |

Primary Examiner—Leonard E. Smith
Attorney, Agent, or Firm—Michael J. Striker

[57] ABSTRACT

A pressure oil lubricating device, particularly for knitting machines, comprises an oil storing container, at least one oil spraying nozzle, an electromagnetically actuatable oil pump having a suction side connected with the oil storing container and a pressure side connected with the at least one oil spraying nozzle, a pressure conduit connecting the pressure side of the oil pump with the at least one oil spraying nozzle and being branched into several branching pressure conduits, a plurality of electromagnetic valves each opening and closing a respective one of the branching pressure conduits, an oil distributing chamber with which each of the branching pressure conduits is connected, a plurality of nozzle supplying conduits also connected with the oil distributing chamber and each provided with a connecting nipple with a return valve, and control unit provided with a microprocessor and operative so as to activate automatically and arbitrarily at will a driving of the oil pump and a successive opening of the electromagnetic valves.

5 Claims, 2 Drawing Sheets

PRESSURE OIL LUBRICATING DEVICE

BACKGROUND OF THE INVENTION

The present invention relates to a pressure oil lubricating device, especially for knitting machines. More particularly it relates to a pressure oil lubricating device which has an oil pump formed as an electromagnetically actuatable rocking piston pump which is connected at its suction side with an oil storage container and connected by a pressure conduit with at least one oil spring nozzle.

Various lubricating devices for knitting machines are known. It is also known to form a pressure oil lubricating device with the features described hereinabove, in which lubrication is performed by spraying of oil without admixture of air. The known pressure oil lubricating devices possess some disadvantages which can be eliminated so that they can be further improved.

SUMMARY OF THE INVENTION

Accordingly, it is an object of the present invention to provide a pressure oil lubricating device which can be adopted very easily to different applications, for example to different knitting machines, and which is designed so that this adaptation can be carried out by an operator of the machine.

In keeping with these objects and with others which will become apparent hereinafter, one feature of the present invention resides, briefly stated, in a pressure oil lubricating device in which a pressure conduit is subdivided into a plurality of branching pressure conduits each closable and openable by an electromagnetic valve, each branching pressure conduit leads to an oil distributing chamber which is also connected with several nozzle supplying conduits via a connecting nipple with a return valve, and control means with a programmable microprocessor is provided and operates so that driving of the rocking piston pump and a successive opening of the electromagnetic valves are performed automatically and at will.

The pressure oil lubricating device in accordance with the present invention does not have any outer pressure air connection and this is the advantage in that, independently of the number of the nozzle supplying conduits, it can be provided always with the same oil pump with a matching capacity. By the subdivision of the pressure conduit extending from the oil pump into various branching conduits openable and closable by means of an electromagnetic valve and by the provision of the control means which switch the oil pump always to operate to one branching conduit and to switch several branching conduits one after the other, the oil pump cannot oversupply with a greater number of lubricating nozzles, a subdivision of these nozzles to a greater number of branching pressure conduits is carried out, and the number of the nozzle supply conduits connected with the oil distributing chamber of each branching pressure conduit is limited in correspondence with the maximum capacity of the oil pump to a predetermined maximum value.

With the use of the microprocessor of the control means, the user can adjust the desirable lubricating value in correspondence with the utilized machine or the loading degree of the machine. The control means can be provided with a program keyboard for adjusting the opening time and the closing time of several electromagnetic valves and the time of a pre-running and a post-running of the rocking piston pump relative to the opening times of the electromagnetic valves. Advantageously, it also can be provided with an optical indicator for the given values. Advantageously, the control means for each branching pressure conduit has an additional key which can provide, independently of the given program values for the lubrication, a simultaneous actuation of the pump as well as the electromagnets associated with the branching pressure conduits, in a manual manner for performing spraying of the lubricating points. The spraying process continues as long as this additional key is activated.

In addition, the control means of the pressure oil lubricating device can perform a control of individual lubricating points, so that the individual nozzle supplying conduits are monitored whether an oil flow takes place in them. By means of a return valve arranged in each connecting nipple of a nozzle supplying conduit, the nozzle supplying conduits remain filled during the time of lubricating pauses, always up to the oil spraying nozzle, while the lubricating process is always guaranteed from a discharge of oil from the oil spraying nozzle at the beginning of the lubricating process so that the lubricating oil quantity is accurately dosed.

Advantageously, the throughflow indicating devices are also arranged in the connecting nipples for the nozzle supplying conduits. The nozzle indicating devices include a freely floatable oil-liftable piston, provided with a permanent magnet, and a stationary Hall generator located opposite to the piston so as to provide a monitoring signal for the control means. When an oil spraying nozzle is clogged, the failure of oil throughflow is indicated. When an electromagnetic valve is not open, the throughflow indicating devices indicate a failing oil throughflow in all associated nozzle supplying conduits. The same is true when the oil pump supplies no oil.

Advantageously, the control means not only have indicating elements which are actuatable by the signals produced by the throughflow indicating devices, but also are provided with known signal generators or switching stages, such as an oil condition indicator or a switching delay stage, which guarantee that a lubrication of a machine takes place first after a predetermined warming time of the machine.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
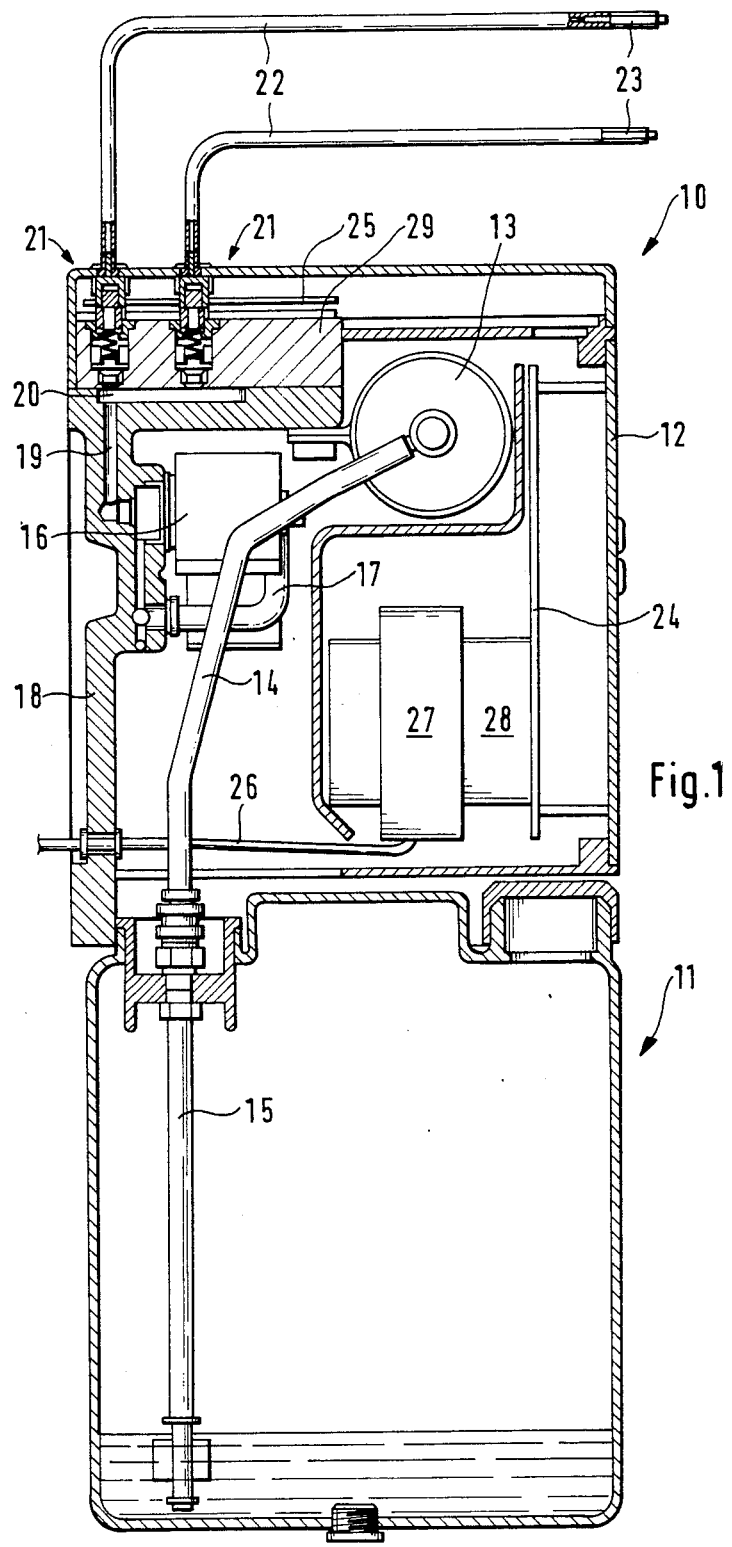
FIG. 1 is a view showing a central longitudinal section through a housing of a pressure oil lubricating device in accordance with the present invention, with a connected oil storing container.

FIG. 1 shows a pressure oil lubricating device which has a housing 10 which is directly arranged on an oil storing container 11. The oil storing container can be arrahged, however, separately from the housing 10 and formed for example as a central container for a whole machine group. Housing 10 is provided at its one side with a front control plate 12 which is shown in detail in FIG. 4.

An electromagnetically actuatable rocking piston pump 13 is arranged in the interior of the housing 10. Its suction conduit 14 is connected with a raising pipe 15 arranged in the oil storing container 11. The pressure side of the rocking piston pump 13, which cannot be seen in FIG. 1, branches into several branching pressure conduits in a not shown manner. The branching pressure conduits lead to an electromagnetic valve 16 and are arranged near one another. FIG. 1 shows a cross-section of one branching pressure conduit. The branching pressure conduit 17 leads from the electromagnetic valve 16 to a distributing chamber 20, via a passage 19 formed in a housing part 18. Each of the plurality of branching pressure conduits 17 leads to a separate distributing chamber 20. A plurality of nozzle supply conduits lead from each distributing chamber 20 via a specially designed connecting nipple 21. Two nozzle supplying conduits 22 are shown in FIG. 1. Each of them ends at an oil spraying nozzle 23 which is associated with a machine part to be lubricated. The construction of the connecting nipple 21 will be described later on in connection with FIGS. 2 and 3.

The electrical control device of the pressure oil lubricating arrangement is also accommodated in the housing 10. The electrical switching points are partially arranged on a conductor plate 24 located behind the control panel 12, and partially mounted on a conductor plate 25 located in the region of the connecting nipple 21. The conductor plate 24 also carries a power part 27 which is supplied via an outwardly extending connecting cable 26, and a programmable microprocessor 28 of the control arrangement which is symbolically illustrated as a box. For the sake of better visibility, the connecting conductors between the conductor plates 24 and 25, and switching elements and indicating elements of the control panel 12 are not shown in FIG. 1.

Figure 2:
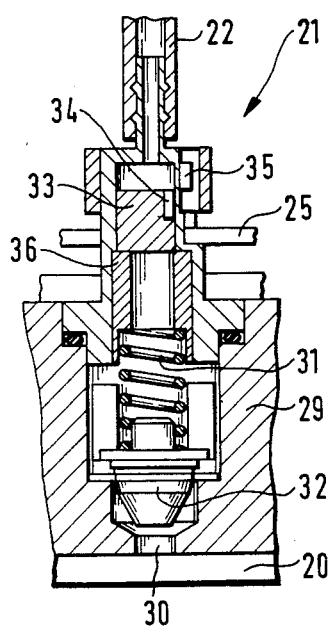
FIG. 2 is a view showing a connecting nipple for a nozzle supplying conduit, in a longitudinal section, in a first operational position and on an enlarged scale.
Figure 3:
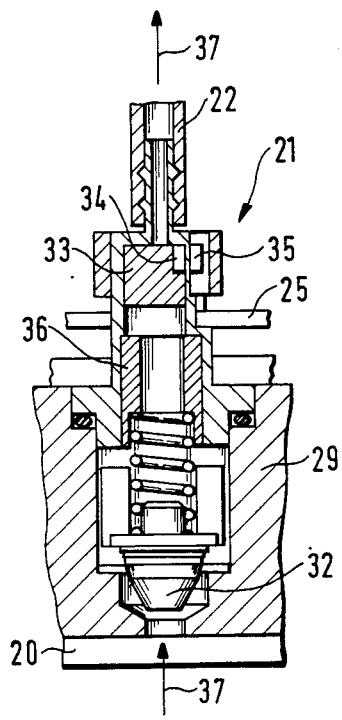
FIG. 3 is a view substantially corresponding to the view of FIG. 2, but showing the connecting nipple in a second operational position.

As can be seen from FIGS. 2 and 3, the connecting nipple 21 for the nozzle supplying conduit 22 is anchored in a housing plate 29 and combined with a return valve. The return valve is seated in an opening 30 of the housing plate 29 which leads to the distributing chamber 20. It has a valve member 32 which is acted upon by a pressure spring 31 and is openable by a pump pressure to allow a flow of oil into the nozzle supplying conduit 22, when during running of rocking piston pump 13 the associated electromagnet 16 opens in the branching pressure conduit 17.

A float piston 33 which is pressure oil loadable, but also flowable around, is arranged in the part of the connecting nipple 21 located above the return valve. The float piston 33 is provided at its one side with a permanent magnet plate 34. A Hall generator 35 is arranged at the same side in the housing of the connecting nipple 21. The Hall generator has a semiconductor through which a control current flows, and which is influenceable by the permanent magnet plate 34 of the float piston 33. FIG. 2 shows the connecting valve with a pressure-free distributing chamber 20, or in other words, with closed electromagnetic valve 16. The float piston 33 is lowered in the connecting nipple 21 and contacts an abutment sleeve 36 of the connecting nipple 21. FIG. 3 shows the lubricating nipple 21 with opened electromagnetic valve 16 or in other words, under the action of pumping pressure in the distributing chamber 20. The valve member 32 of the return valve is lifted from its valve seat, and the pressure oil flows in direction of the arrow 37 through the connecting valve 21 into the nozzle suplying conduit 22. Under the action of the oil flow, the floating piston 33 is lifted from the abutment sleeve 36 and its permanent magnet plate 34 displaces in front of the Hall generator 35 which is correspondingly influenced and supplies a control signal to the control device. The Hall generators 35 of all connecting nipples of the lubricating device are connected with the joint conductor plate 25. They can be advantageously integrated with their evaluating electronic circuitry in one IC.

Figure 4:
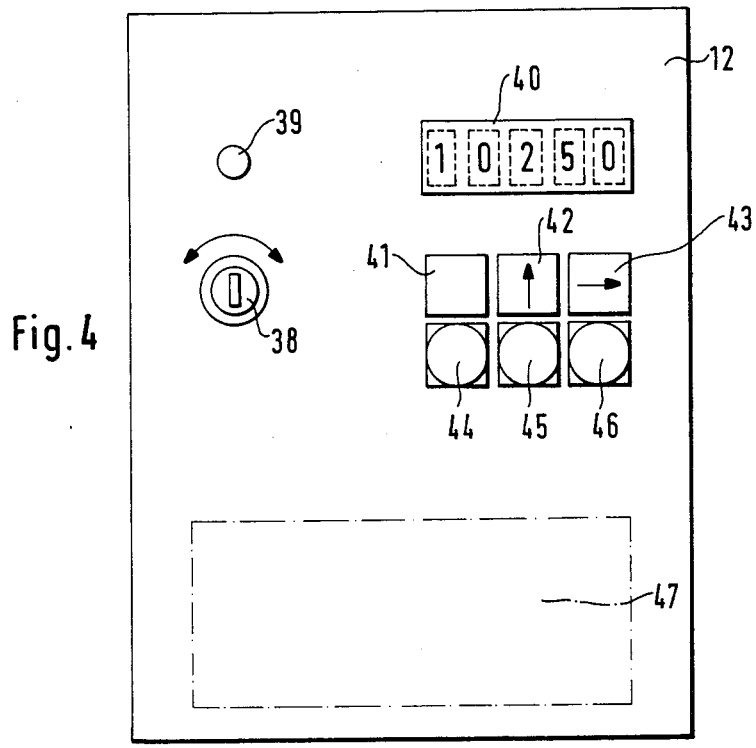
FIG. 4 is a view showing a control board on the housing of the pressure oil lubricating device in accordance with the present invention.

The control panel 12 of the housing 10 shown in FIG. 4 has a keyswitch 38, and oil condition control indicating lamp 39, and an optical indicating field 40 for four digital points and a keyboard. The keyboard includes six keys, wherein the upper three keys 41, 42, 43 are programming keys for the microprocessor. The lower three keys 44, 45, 46 are manual pressing keys for three different electromagnetic valves 16, or in other words for three oil spraying nozzle groups of the pressure oil lubricating device. In the programmable keys, the left key 41 is a switching key for switching over from one programming point to the other programming point, the central key 42 is a key for upward switching, and the right key 43 is a key for step-like return switching of the program data values.

A field 47 in the control plate 12, which is delimited by a broken line,is provided with not shown light diodes. They are actuated in dependence upon the signals of the throughflow indicating device, or in other words the Hall generators 35 of the connecting nipples 21.

The pressure oil lubricating device operates in accordance with the following procedure:

First, programming of the microprocessor takes place. In the shown embodiment eight different program points can be selected by the key 41.

Program point 1: The opening time of the first magnetic valve 16.

Program point 2: The pause time of the first magnetic valve 16.

Program point 3: The opening time of a second magnetic valve 16.

Program point 4: The pause time of the second magnetic valve 16.

Program point 5: The opening of a third magnetic valve 16.

Program point 6: The pause time of the third magnetic valve 16.

Program point 7: A running time of the rocking piston pump.

Program point 8: A pause-running time of the rocking piston pump.

For each adjusted program point indicated at a location of the indicating field 40, the keys 42 and 43 can provide a predetermined value by upward (forward)

counting or downward (rearward) counting which is also indicated in the indicating field 40.

With turning-on of the machine to be lubricated, for example a knitting machine, the control device with the programmed microprocessor is activated. A delay step of the control device serves for setting the lubricating program with the adjusted times first after a predetermined warming time of the machine. Then switching of three individual magnetic valves 16 is performed one after the other, and not simultaneously. Shortly before the first lubricating step, the rocking piston pump runs with the programmed prerunning time, aspirates oil through the raising pipe 15 and the suction conduit 14 from the oil storing container 11, and first operates against the closed magnetic valve 16 for building the pressure required for lubrication. Then the first of the three electromagnetic valves 16 is opened over the programmed opening time, and the closed oil spraying nozzles 23 spray oil during this opening time. Subsequently, other electromagnetic valves 16 are opened after one another, and after closing of the third electromagnetic valve 16, the pump runs over the predetermined post-running time provided in the programming point 8. After elapsing of the given pause times, a new opening of the individual electromagnetic valve 16 is performed. Here different pause values can be provided for the individual electromagnetic valves after each closing of an electromagnetic valve 16, but the post-running of the rocking piston pump takes place.

When spraying of the lubricating points associated with the individual electromagnetic valve 16 in groups is desired, without acting on the programmed value by pressing the key 44, the rocking piston pump 13 and the first of the electromagnetic valves 16 are turned on simultaneously. Thereby, the rocking piston pump 13 supplies pressure oil into the oil spraying nozzles 23 to the lubricating points associated with the first electromagnetic valve 16 as long as the key 44 is pressed. By pressing the key 45 or the key 46, the second or third electromagnetic valve 16 is activated together with the rocking piston pump 13. The switching is selected so that none of two electromagnetic valves can open simultaneously.

When with one open electromagnetic valve 16 the nozzle supplying conduit associated with the Hall generators 35 does not produce any signal, a failure indication is generated in the indicating field 47 of the front plate 12 of the housing 10. Different indicators can be provided, depending on whether only one Hall generator or all Hall generators signal an oil spraying nozzle group failure. Also, turning off of the knitting machine in dependence upon the failure signal generation can be provided.

It will be understood that each of the elements described above, or two or more together, may also find a useful application in other types of construction differing from the types described above.

While the invention has been illustrated and described as embodied in a pressure oil lubricating device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A pressure oil lubricating device for knitting machines, comprising an oil storing container; an oil pump driven intermittently and having a pressure side and a suction side connected with said oil storing container; a plurality of oil straying nozzles connected to said pressure side; a device for monitoring an oil flow to each of said oil spraying nozzles, said pump being an electromagnetically actuatable rocking piston oil pump; means defining a plurality of oil distributing chambers; a pressure conduit branched into a plurality of branching pressure conduits each connecting said pressure side to a respective oil distributing chamber; a plurality of electromagnetic valves each opening and closing a respective one of said branching pressure conduits; a plurality of nozzle supplying conduits each interconnected between a respective oil spraying nozzle and an assigned oil distributing chamber, each nozzle supplying conduit being provided with a connecting nipple including a return valve; and control means including a programmable microprocessor, said microprocessor being connected to said pump and also to said electromagnetic valves and being operative to adjust driving times of said rocking piston pump and an opening time and a closing time of each of said electromagnetic valves and also to adjust a time of a pre-running and a time of post-running of said rocking piston pump.

2. A pressure oil lubricating device as defined in claim 1; further comprising a plurality of throughflow indicating means each associated with a respective one of said nozzle supplying conduits and connected with said control means, each of said throughflow indicating means being arranged in a respective one of said connecting nipples of said nozzle supplying conduits and including a freely rotatable oil liftable float piston provided with a permanent magnet, and a stationary Hall generator arranged opposite to said float piston and producing a monitoring signal for said control means.

3. A pressure oil lubricating device as defined in claim 1, wherein said control means is provided with a central keyboard and an additional key for each of said branching pressure conduits so as, independently of individual program values, to provide a simultaneous actuation of said pump and a respective one of said electromagnetic valves associated with a respective one of said branching pressure conduits in a manual manner.

4. A pressure oil lubricating device as defined in claim 2 and further comprising indicating means operative by signals produced by each of said Hall generators of said throughflow indicating means.

5. A pressure oil lubricating device as defined in claim 1, wherein said control means includes a switching delay means.

* * * * *